United States Patent
Binder et al.

(10) Patent No.: US 9,062,720 B2
(45) Date of Patent: Jun. 23, 2015

(54) TRANSMITTER WITH PREASSEMBLED SYNCHRONIZER RINGS

(75) Inventors: Juergen Binder, Hohentengen (DE); Thomas Schnelzer, Peiting (DE); Peter Echtler, Schongau (DE); Michael Koelzer, Rosshaupten (DE); Peter Kramer, Westerheim (DE)

(73) Assignee: HOERBIGER ANTRIEBSTECHNIK HOLDING GMBH, Schongau (DE)

( * ) Notice: Subject to any disclaimer, the term of this patent is extended or adjusted under 35 U.S.C. 154(b) by 127 days.

(21) Appl. No.: 13/820,251

(22) PCT Filed: Aug. 31, 2011

(86) PCT No.: PCT/EP2011/004402
§ 371 (c)(1),
(2), (4) Date: May 2, 2013

(87) PCT Pub. No.: WO2012/028316
PCT Pub. Date: Mar. 8, 2012

(65) Prior Publication Data
US 2013/0233668 A1      Sep. 12, 2013

(30) Foreign Application Priority Data
Sep. 3, 2010   (DE) .......................... 10 2010 036 278

(51) Int. Cl.
F16D 11/14   (2006.01)
F16D 23/04   (2006.01)
F16D 23/06   (2006.01)

(52) U.S. Cl.
CPC ................ *F16D 11/14* (2013.01); *F16D 23/06* (2013.01); *F16D 23/0606* (2013.01); *F16D 2023/0618* (2013.01); *F16D 2023/0631* (2013.01)

(58) Field of Classification Search
USPC ................. 192/53.33, 53.341, 53.36, 53.361, 192/53.331, 53.332
See application file for complete search history.

(56) References Cited

U.S. PATENT DOCUMENTS

| 2,245,816 | A | * | 6/1941 | Peterson ................... 192/53.33 |
| 3,451,513 | A | | 6/1969 | Aktiengesellschaft |
| 4,138,007 | A | * | 2/1979 | Wakabayashi ............. 192/53.33 |
| 5,901,823 | A | * | 5/1999 | Nellums .................... 192/53.31 |
| 6,637,573 | B1 | * | 10/2003 | Schwuger et al. ....... 192/53.361 |

FOREIGN PATENT DOCUMENTS

| AT | 136064 | 12/1933 |
| CN | 1208137 A | 2/1999 |
| CN | 1103880 C | 3/2003 |

(Continued)

OTHER PUBLICATIONS

International Search Report mailed Oct. 20, 2011 for PCT/EP2011/004402.

(Continued)

*Primary Examiner* — Rodney H Bonck
(74) *Attorney, Agent, or Firm* — Lowe Hauptman & Ham, LLP

(57) ABSTRACT

The invention relates to a transmitter (18) for a synchronizing assembly of a manual transmission, having a thrust piece (42), a spring (44; 84) that cooperates with the thrust piece (42), and at least one synchronizer ring (30), the thrust piece (42) being acted upon by the spring (44) such that the transmitter (18) can transmit a pre-synchronizing force to the synchronizer ring (30) in the axial direction.

20 Claims, 13 Drawing Sheets

(56) References Cited

FOREIGN PATENT DOCUMENTS

| | | |
|---|---|---|
| DE | 1505732 | 7/1970 |
| DE | 2754382 | 4/1979 |
| DE | 4324814 | 1/1995 |
| DE | 19701538 | 7/1998 |
| DE | 19740305 | 3/1999 |
| EP | 0272103 | 6/1988 |
| EP | 1239175 | 9/2002 |
| EP | 1239175 A1 | 9/2002 |
| FR | 907307 | 3/1946 |
| FR | 1124130 | 10/1956 |
| JP | 1970041164 B | 12/1970 |
| JP | 1996042595 A | 2/1996 |
| JP | 1997144772 A | 6/1997 |
| JP | 2005256995 A | 9/2005 |
| JP | 2008215450 A | 9/2008 |
| WO | 2011/029558 | 3/2011 |

OTHER PUBLICATIONS

Written Opinion From the ISA mailed Oct. 20, 2011 for PCT/EP2011/004402.

International Preliminary Report on Patentability From the International Bureau of WIPO mailed Mar. 14, 2013 for PCT/EP2011/004402.

Chinese Office Action dated Nov. 18, 2014.

Japanese Office Action dated Feb. 17, 2015.

* cited by examiner

TRANSMITTER WITH PREASSEMBLED SYNCHRONIZER RINGS

CROSS REFERENCE TO RELATED APPLICATION

This application claims the priority of German Patent Application No. 10 2010 036 278.6, filed on Sep. 3, 2010 in the German Patent and Trade Mark Office (DPMA). Further, this application is the National Phase application of International Application No. PCT/EP2011/004402 filed Aug. 31, 2011, which designates the United States and was published in German.

The invention relates to a transmitter for a synchronizing assembly of a manual transmission.

In manual transmissions as are employed in particular in motor vehicles, the synchronizing assembly serves to produce a connection preventing relative rotation between a gear shaft and a speed change gear or gearwheel arranged as a movable gear on the gear shaft. In a first step of the gear shifting process, the synchronizing assembly makes sure that the speed of the speed change gear to be shifted is adjusted to the speed of the gear shaft. In a second step, a connection is then produced for joint rotation of the gear shaft and the speed change gear. The respective gear is then changed.

Synchronizing assemblies which include a synchronizer hub, thrust pieces received therein, synchronizer rings and a gearshift sleeve as the essential components are generally known. Upon actuation of the gearshift sleeve, one of the synchronizer rings is pressed by means of the thrust pieces against a friction surface which is associated with the speed change gear to be shifted. Once the speed of the speed change gear is synchronized with the speed of the gear shaft, the gearshift sleeve can be shifted through completely, so that it engages in a toothing associated with the speed change gear. In this way, a connection preventing relative rotation is established from the synchronizer hub to the speed change gear.

A disadvantage in the known synchronizing assemblies is the very complex and partly very voluminous structure.

The object of the invention consists in allowing the gears of a manual transmission to be synchronized and shifted with lower effort.

To achieve this object, according to the invention provision is made for a transmitter for a synchronizing assembly of a manual transmission, including a thrust piece, a spring that cooperates with the thrust piece, and at least one synchronizer ring, the thrust piece being acted upon by the spring such that the transmitter can transmit a pre-synchronizing force to the synchronizer ring in the axial direction. In this way, an assembly is provided which can be preassembled and then be built into a manual transmission and which already contains the essential functional parts. The transmitter can be axially displaced on the gear shaft to produce the connection preventing relative rotation between the gear shaft and the speed change gear. The synchronizer ring provides for the necessary speed adjustment between the gear shaft and the speed change gear before the connection preventing relative rotation between the gear shaft and the speed change gear is established. The thrust piece ensures the so-called pre-synchronization and fixes the synchronizer ring in a neutral position, so that any undesirable drag torques are reduced or eliminated.

Preferably, provision is made that the synchronizer ring is provided with at least one drive dog which has a locking surface formed thereon which can cooperate with the transmitter in the peripheral direction. In this way, the locking function which prevents a shifting through of the transmitter as long as the speeds of the speed change gear and of the gear shaft are not yet synchronized is integrated into the synchronizer ring.

Provision is made according to a variant that the synchronizer ring is provided with at least one pre-synchronizing slope which can be engaged by the thrust piece under the action of the spring. The pre-synchronizing slope causes the synchronizer ring to be fixed in a neutral position but, at the same time, allows the shifting through of the transmitter in that it displaces the thrust piece contrary to the action of the spring when the transmitter is shifted through.

Preferably, provision is made that the pre-synchronizing slope is formed on the drive dog. This results in a very compact structure.

According to one embodiment, provision is made that the thrust piece is guided in the transmitter in the peripheral direction and in the axial direction. This also leads to a compact structure of the transmitter.

According to a preferred embodiment, provision is made that the thrust piece is arranged in a recess which is opened inward in the radial direction, and that the spring is supported at an abutment that is configured separately from the transmitter. Having a transmitter that is opened inward in the radial direction, i.e. toward the center axis of the gear shaft, facilitates assembly of the thrust piece in the transmitter.

According to one variant, provision may be made that the abutment is a clip which is hung in at the transmitter. Using the clip, the opening in the transmitter can be closed and the abutment for the spring may be formed at the same time in a technically simple manner.

According to a different variant, provision is made that the abutment is a holding ring which is inserted in the transmitter. This configuration distinguishes itself by a particularly small number of individual parts since the openings for the assembly of all thrust pieces can be closed by one component, namely the holding ring.

According to a different embodiment, provision is made that the thrust piece is arranged in a recess which is opened inward in the radial direction, and that the spring is in the form of a spring washer which is inserted in the transmitter. This design results in an even simpler structure since the separate springs for the thrust pieces are eliminated.

Preferably, provision is made that two synchronizer rings are mounted at the transmitter. This allows two gear ratio steps of the transmission to the shifted by actuating the transmitter in one or in the other direction.

According to an embodiment of the invention, provision is made that the two pre-synchronizing slopes of the synchronizer rings are positioned obliquely in the axial direction, in that the two synchronizer rings are connected with each other in the axial direction, and in that in an initial position, the thrust piece rests against the two pre-synchronizing slopes. This design distinguishes itself by a simple structure, low drag torques due to the axial coupling of the synchronizer rings, a small space requirement, and a simple assembly.

In this embodiment, each of the synchronizer rings may have at least one connecting tab provided thereon by means of which the two synchronizer rings are connected with each other with an interlocking fit. This makes it easier to preassemble the synchronizer rings at the transmitter since the connecting tabs can be fitted through connecting openings of the transmitter. Once the two synchronizer rings are connected with each other with an interlocking fit, they can no longer be released from the transmitter.

According to an alternative embodiment, provision is made that the two synchronizer rings are mounted at the transmitter for rotation in the peripheral direction, in that they include two drive dogs which are arranged opposite each other and which each have two locking surfaces provided thereon, and in that the thrust piece pushes the two drive dogs apart in the peripheral direction, so that the two drive dogs rest against the transmitter in opposite directions. This embodiment also distinguishes itself by a simple structure, a small space requirement and a simple assembly.

Provision is preferably made here that each synchronizer ring is provided with four drive dogs. In this way, the synchronizer rings can be precisely guided on the drive dog in the axial direction.

Preferably, provision is made that each drive dog has two release slopes arranged thereon which are spaced apart from the locking surfaces in the axial direction. The release slopes ensure that the corresponding synchronizer ring is released again from a friction surface associated with it when the transmitter is pushed back from the shifted-through position to the neutral position.

According to a further alternative configuration, provision is made that two synchronizer rings are mounted at the transmitter, the thrust piece being mounted in a first synchronizer ring and engaging into an opening in the second synchronizer ring. This embodiment distinguishes itself by a simple and cost-effective structure, low drag torques due to the axial coupling of the synchronizer rings, a low tendency to rattle due to the radial centering of the synchronizer rings, as well as a small space requirement.

Preferably, provision is made here that the thrust piece is mounted in a holding cup which also serves as an abutment for the spring. The holding cup here serves for a precise guidance of the thrust piece.

Preferably, provision is made that the thrust piece is captively fixed in place in the holding cup by a snap-in hook. This allows the thrust piece together with the spring to be preassembled in the holding cup such that it is held without any further measures.

In this embodiment, provision may be made that the first synchronizer ring is provided with two drive dogs located opposite each other, between which the holding cup can be hung in. In this configuration, the drive dogs assume a dual function: for one thing, they cooperate with the transmitter and, for another thing, they serve to attach the synchronizer rings axially to each other.

For the cooperation with the transmitter, the drive dogs are preferably provided with two locking surfaces each, which are provided on the peripherally exterior edges of the drive dogs.

Preferably, provision is made for three groups of drive dogs located opposite each other. This allows the two synchronizer rings to be guided in the transmitter precisely.

To attach the second synchronizer ring to the first one, provision may be made that the second synchronizer ring is provided with a connecting tab in which the opening is formed. This configuration distinguishes itself by a simple structure.

Provision is preferably made that the thrust piece is provided with two pre-synchronizing slopes which can engage the transmitter. In this manner, the assembly formed by the two synchronizer rings is precisely fixed in a neutral position.

The invention will be described below with reference to various embodiments which are illustrated in the accompanying drawings, in which:

FIG. 1 schematically shows a synchronizing assembly with a transmitter according to a first embodiment of the invention in a sectional view;

Figure 1:
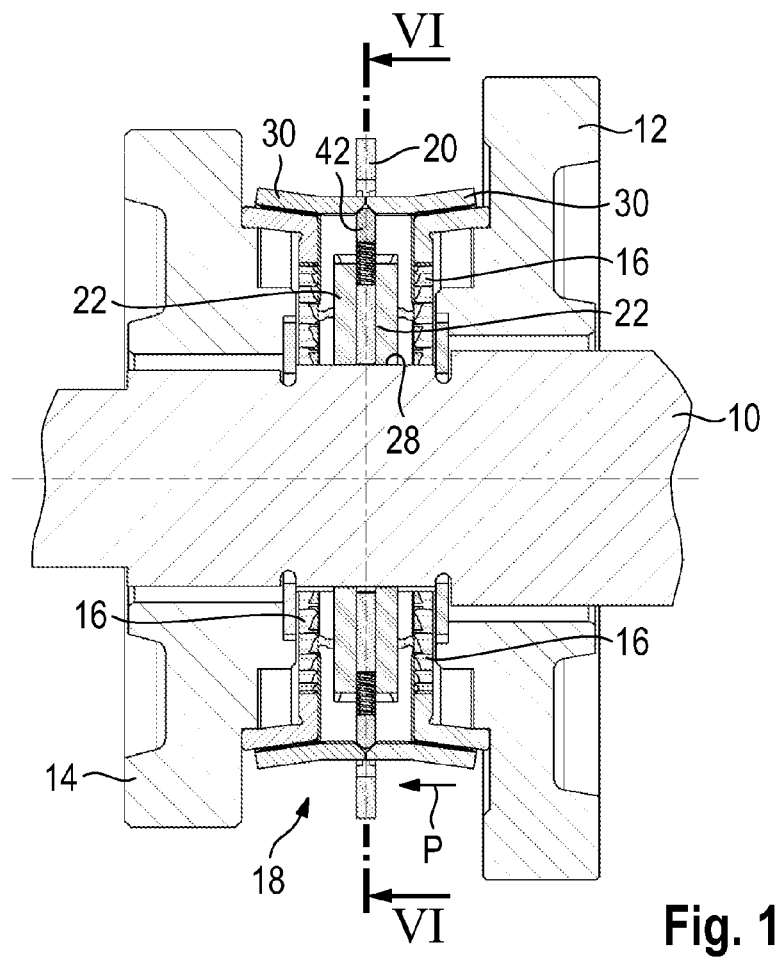
Figure 2:
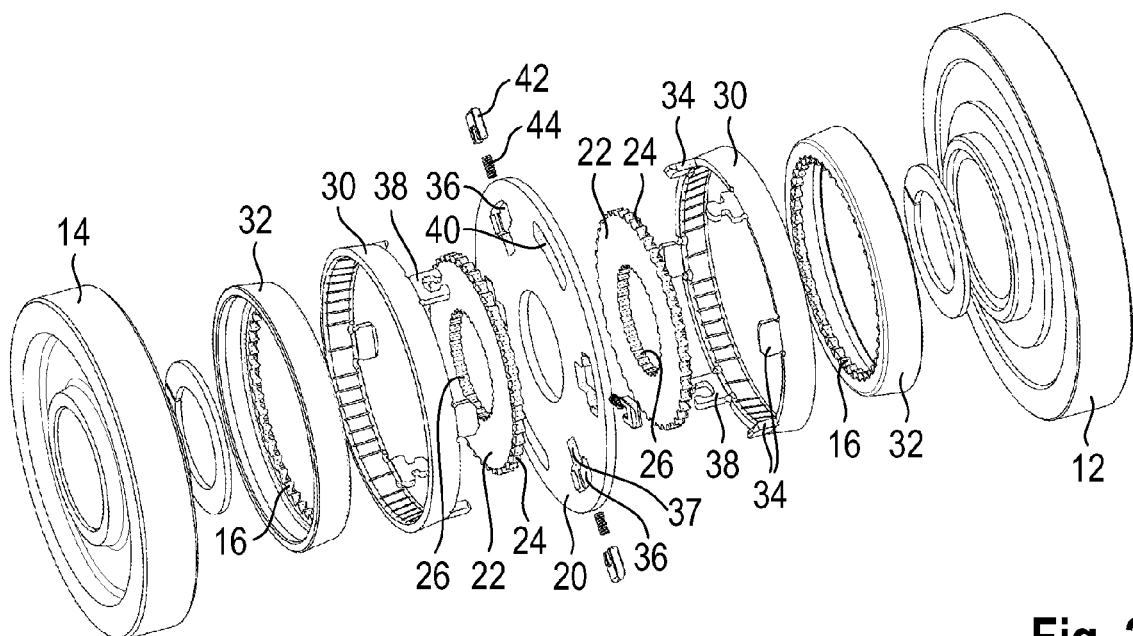
FIG. 2 shows the synchronizing assembly of FIG. 1 in an exploded view.
Figure 3:
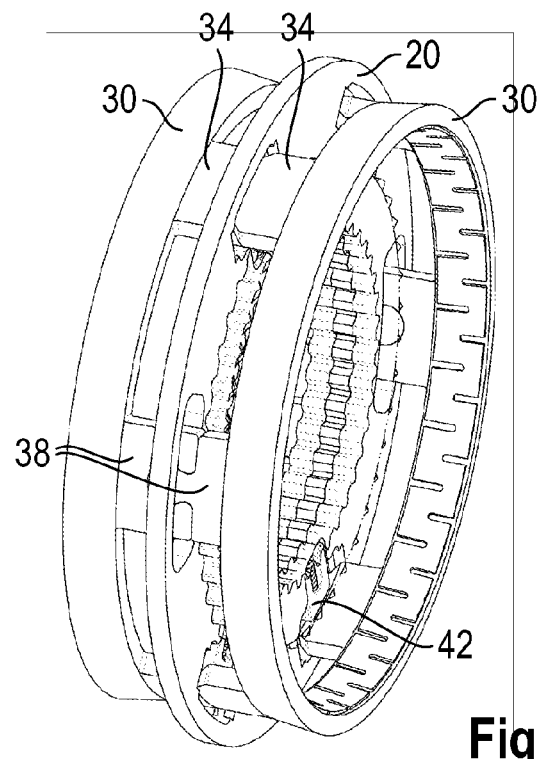
FIG. 3 shows the transmitter with synchronizer rings fitted thereto in a perspective view.
Figure 4:
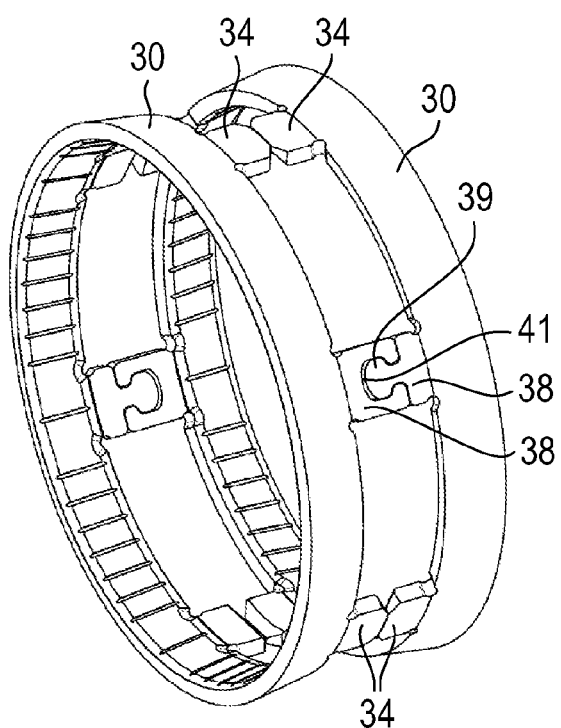
FIG. 4 shows the synchronizer rings of FIG. 3 in a perspective view.
Figure 5:
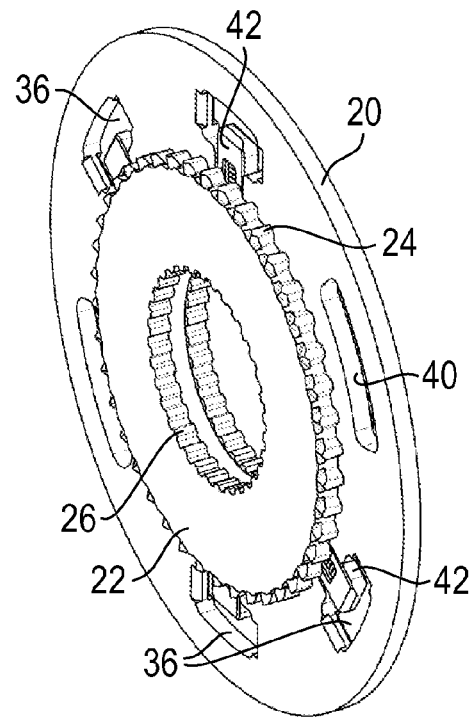
FIG. 5 shows the transmitter of FIG. 3 in a perspective view.
Figure 6:
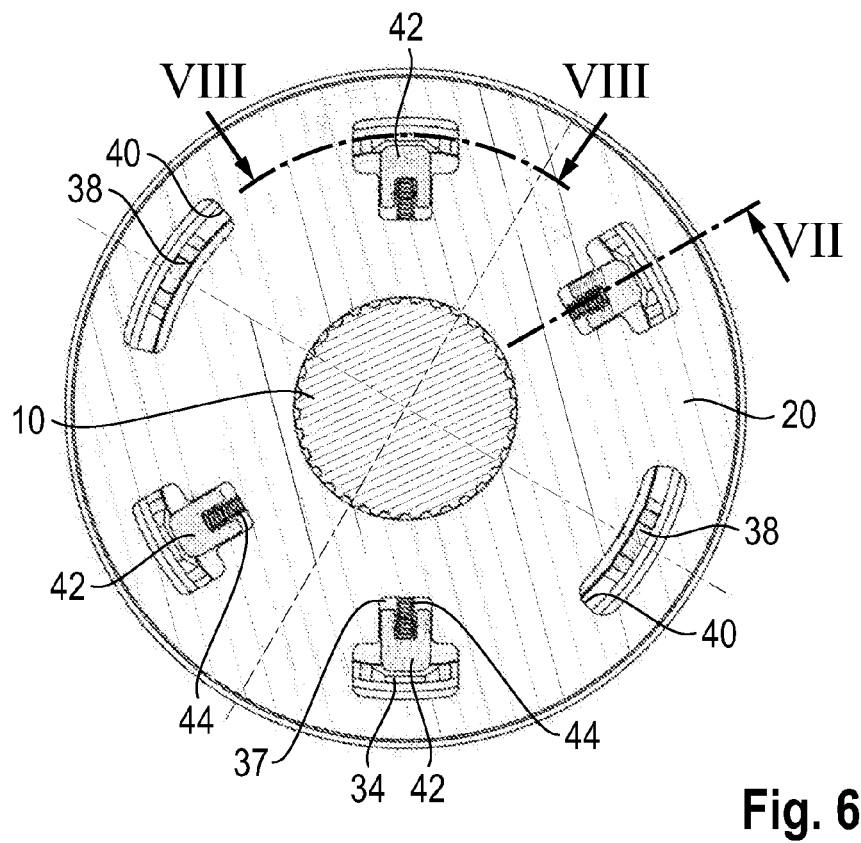
FIG. 6 shows a section taken along the plane VI-VI of FIG. 1.

The basic structure of a synchronizing assembly for a manual transmission will be described below with reference to FIGS. 1 to 8, a transmitter according to a first embodiment being made use of in the synchronizing assembly.

The transmission contains a gear shaft 10 on which two speed change gears 12, 14 are arranged. The two speed change gears 12, 14 are in the form of movable gears, i.e. they can rotate relative to the gear shaft. A clutch toothing 16 is connected to each speed change gear 12, 14 for joint rotation therewith.

Arranged between the two speed change gears 12, 14 is a transmitter 18 which is formed here by a transmitter disk 20 and two clutch disks 22. The two clutch disks 22 are arranged on either side of the transmitter disk 20 and have an external toothing 24 and an internal toothing 26. The external toothing 24 is made to be complementary to the clutch toothing 16, and the internal toothing 26 is in engagement with a gear shaft toothing 28. The clutch disks 22 are thus coupled in the peripheral direction for joint rotation with the gear shaft 10, but can be shifted on the gear shaft in the axial direction.

Arranged on either side of the transmitter disk 20 is a respective synchronizer ring 30 which can cooperate with a friction surface 32 that is associated with the corresponding speed change gear 12 and 14, respectively. The two synchronizer rings include a plurality of drive dogs 34 that extend into recesses 36 in the transmitter disk 20, and two diametrically opposed connecting tabs 38 that extend through connecting openings 40 in the transmitter disk 20 (see in particular FIG. 3). The connecting tabs 38 serve to couple the two synchronizer rings to each other in the axial direction. In the coupled condition (see FIG. 4), the free ends of the drive dogs 34 of the two synchronizer rings 30 are positioned closely opposite one another.

In order to connect the two synchronizer rings with each other, one of the synchronizer rings is formed to have a connecting projection 39 which engages in a connecting opening 41 of the other connecting tab 38. In this way, an interlocking connection is obtained at two diametrically opposed points of the two synchronizer rings, which is configured similar to the connection between two pieces of a puzzle. In this design, it is further of advantage that the two synchronizer rings can be of identical configuration.

Formed at the bottom of each of the recesses 36 is a pocket 37 in which a respective thrust piece 42 (see in particular FIGS. 5 and 6) is arranged which each is urged outward in the radial direction by a spring 44. That is, the thrust piece is guided between the lateral edges of the pocket 37 in the peripheral direction and between the two clutch disks 22 in the axial direction.

Figure 7:
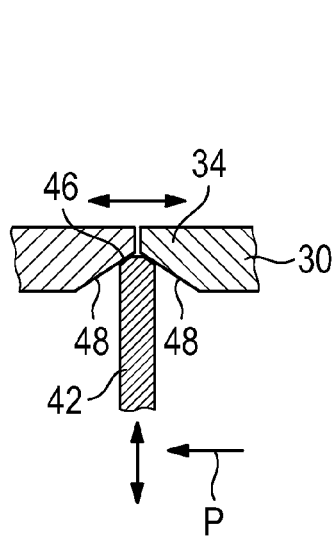
FIG. 7 shows a section taken along the plane VII of FIG. 6.
Figure 8:
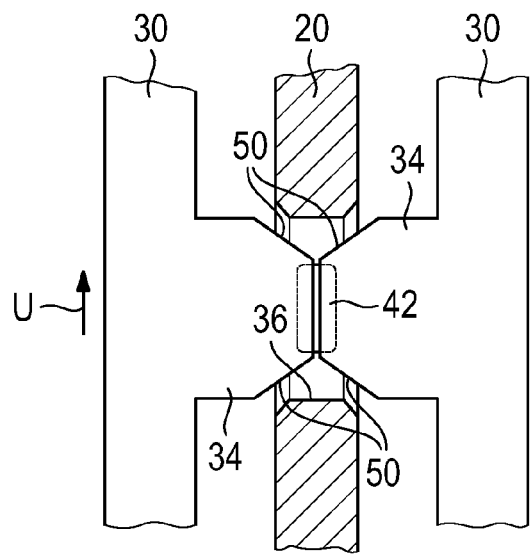
FIG. 8 shows a section taken along the plane VIII of FIG. 6.

Formed on the radially outer end of each thrust piece is a pre-synchronizing surface 46 which rests against pre-synchronizing slopes 48 that are formed on the free ends of the drive dogs 34 on the radially inner side (see FIG. 7). The pre-synchronizing slopes 48 of the drive dogs 34 located opposite each other are oriented such that a V with a large opening angle is formed the tip of which points radially outward.

The drive dogs 34 are formed to have locking surfaces 50 which, as viewed in the peripheral direction, are located opposite the edges of the recess 36 with an oblique orientation. Here, too, the locking surfaces 50 on the oppositely located drive dogs 34 form a V, the tip of each of the two vees of the oppositely located drive dogs being directed toward the center of the recess 36.

The above-described synchronizing assembly operates as follows: When it is intended to change a gear, for example the one containing the speed change gear 14, the transmitter 18 is shifted on the gear shaft 10 in the axial direction by means of a gearshift fork (not shown) in the direction of the arrow P of FIG. 1. In a first step, referred to as pre-synchronization, the two synchronizer rings 30 are entrained to the left by the thrust pieces 42, more precisely by the pre-synchronizing surface 46 of the thrust piece 42 engaging the left-hand pre-synchronizing slope 48 of the left-hand synchronizer ring 30, so that the synchronizer ring 30 moves into a frictional engagement with the friction surface 32.

Usually, the speed of the gear shaft 10 does not correspond to the speed of the speed change gears, so that there is a speed differential between the synchronizer ring 30 and the friction surface 32. This causes the synchronizer ring to be entrained in the peripheral direction (see the arrow U in FIG. 8), as a result of which the locking surface 50 moves into contact with the upper edge—with respect to FIG. 8—of the recess 36. Owing to the oblique orientation of the locking surface 50, this generates a force component which prevents the transmitter disk 20 from being shifted relative to the drive dog 34; as long as there is a speed differential, the friction moment resulting from this causes the locking surface 50 to remain pushed against the edge of the recess 36. The synchronizer ring is supported on the friction surface 32 here and can not be shifted further in the axial direction.

Only when the speed differential has been reduced does the locking force exerted by the locking surface 50 decrease, so that the edge of the recess 36 of the transmitter disk 20 can shift the locking surface 50, owing to the oblique orientation thereof, in the peripheral direction contrary to the direction of the arrow U, which allows a shifting through of the transmitter. At the same time, the thrust pieces 42 are deflected downwards, that is, overpressed, by the obliquely positioned pre-synchronizing slopes 48, contrary to the action of the spring 44. This allows the transmitter to be axially shifted so far that the external toothing 24 of the clutch disk 22 engages into the clutch toothing 16 associated with the speed change gear 14. In this way, a connection is produced preventing relative rotation between the gear shaft 10 and the speed change gear 14 to be changed.

To release the gear changed, the transmitter 18 is shifted back to its center position in the opposite direction, which also causes the two synchronizer rings 30 to be returned to a center position again, in which the frictional engagement with the friction surfaces 32 is canceled.

The special advantage of the first embodiment resides in that a thrust piece having a simple structure can be used, which is guided in a simple manner between the two clutch disks 22 of the transmitter 18 and in the pocket 37. Further, a transmitter 18 is obtained to which the synchronizer rings 30 can be preassembled in a simple manner. The thrust piece 42 holds them in a center position at the transmitter disk 20, in which the interlocking engagement formations on the two connecting tabs 38 lie within the connecting openings 40, so that they can not become detached from one another.

With reference to FIGS. 9 to 12, a transmitter according to a second embodiment of the invention will now be described. Like reference numbers will be used for the components that are known from the above embodiment, and reference is made to the foregoing explanations in this respect.

The essential difference between the first and second embodiments consists in that in the second embodiment the two synchronizer rings 30 are not firmly coupled to each other in the axial direction, but are displaceable in relation to each other. Each synchronizer ring includes four drive dogs 34 which cooperate with each other in pairs. For this purpose, they extend through the recess 36 of the transmitter disk 20 of the transmitter 18. The thrust piece 42 is arranged centrally between the drive dogs 34 that extend through a recess 36 and is urged radially outward by the spring 44. The thrust piece 42 has a rounded shape on its side facing away from the spring 44, so that the tip of the thrust piece is situated between the two drive dogs 34, pushing them apart in opposite directions (see the arrows P in FIG. 10). The lateral edge of each drive dog 34 which is pressed against the edge of the recess 36 is provided with the two locking surfaces 50 which are arranged obliquely adjacent to each other here, so that an acute V is formed. Therefore, in the initial position of the transmitter the two synchronizer rings 30 are fixed in place at the transmitter in that the two locking surfaces 50 of each of the total of four drive dogs 34 of each synchronizer ring are pressed against the edge of the recess 36.

When the transmitter is actuated for changing a gear, it directly entrains the two synchronizer rings 30 via the locking surfaces 50 until one of them hits the friction surface 32 associated with it. Due to the speed differential between the gear shaft and the speed change gear to be changed, a friction moment is produced which seeks to rotate the corresponding synchronizer ring 30 relative to the transmitter disk 20 of the transmitter 18 in such a way that its V-shaped depression between the two locking surfaces 50 is pressed more firmly against the edge of the recess 36. In this way, a locking effect is produced which prevents the shifting through of the transmitter as long as the speeds of the gear shaft and of the speed change gear are not synchronized.

In principle, as regards the transmission of the gearshift forces, a distinction must be made from the direction of action of the friction moments. In the first case, the friction moment acts in the same direction as the drive dogs of the synchronizer rings rest against the locking surfaces, i.e. the gearshift forces are introduced directly via the locking surfaces and the drive dogs of the active synchronizer ring. In the second case, the friction moment acts in the opposite direction. Here, the drive dogs of the active synchronizer ring are rotated against the passive synchronizer ring. In the process, the thrust piece is displaced inward, the gearshift forces being introduced into the active synchronizer ring via the drive dogs of the passive synchronizer ring. This means that the locking function is thus ensured by the drive dogs of the passive synchronizer ring.

Only when no friction moment is present any more does the transmitter disk 20 succeed in slightly rotating the corresponding synchronizer ring 30 by means of the locking surface 50, so that the edge of the recess 36 is released from the two locking surfaces 50 and can slide on the drive dog 34 in the axial direction. In the process, the two synchronizer rings 30 are rotated relative to each other such that one of the two drive dogs arranged in a recess 36 is made to approach the other drive dog, with the thrust piece 42 being elastically displaced downward contrary to the action of the spring 44. Towards the end of the shifting-through movement, the transmitter disk 20 reaches the region of a release slope 60 which, viewed in the axial direction, are arranged on either side of the two locking surfaces 50.

Figure 9:
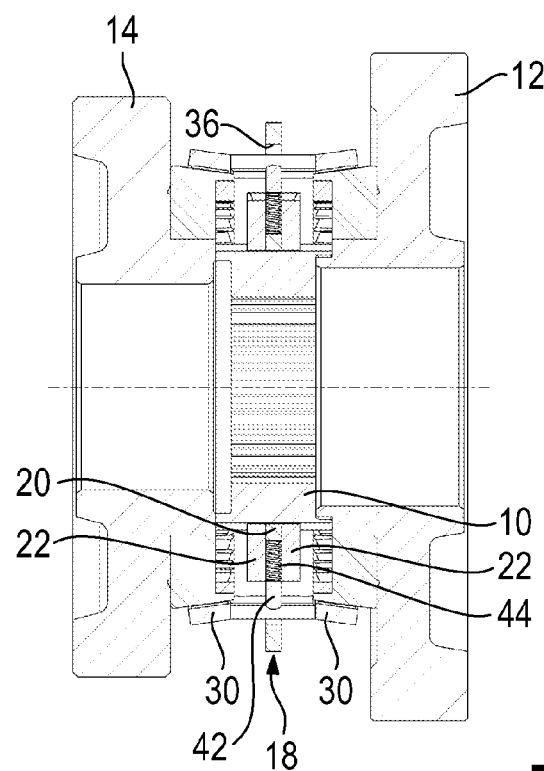
FIG. 9 shows a synchronizing assembly with a transmitter according to a second embodiment of the invention in a sectional view.
Figure 10:
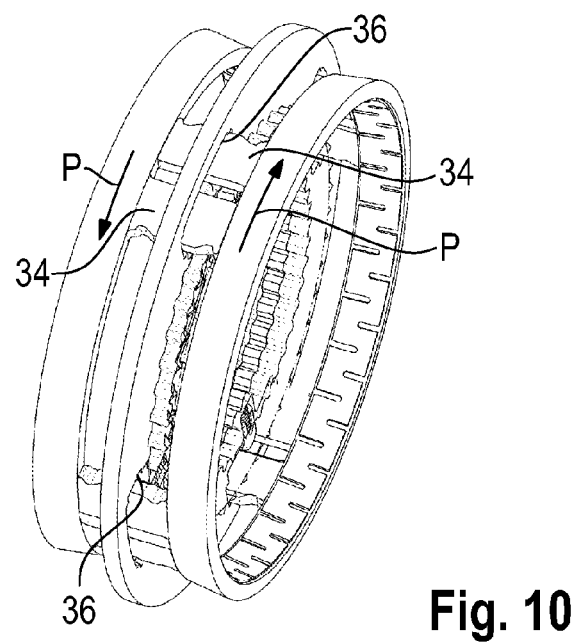
FIG. 10 shows a perspective view of the transmitter with synchronizer rings of FIG. 9 fitted thereto.
Figure 11:
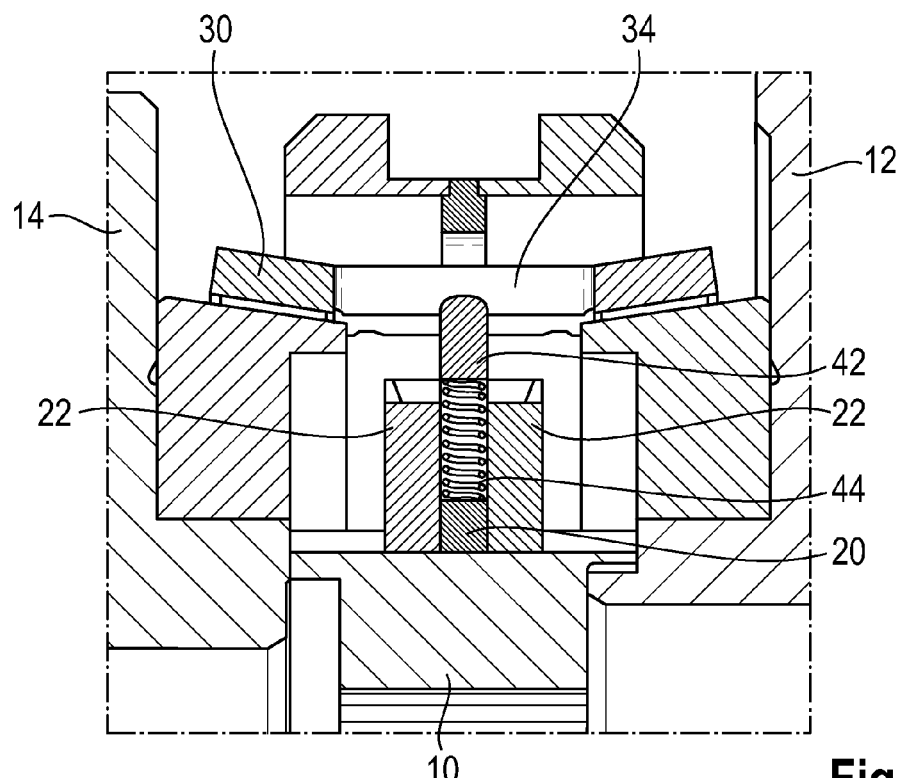
FIG. 11 shows the transmitter of FIG. 9 in an enlarged partial view.
Figure 12:
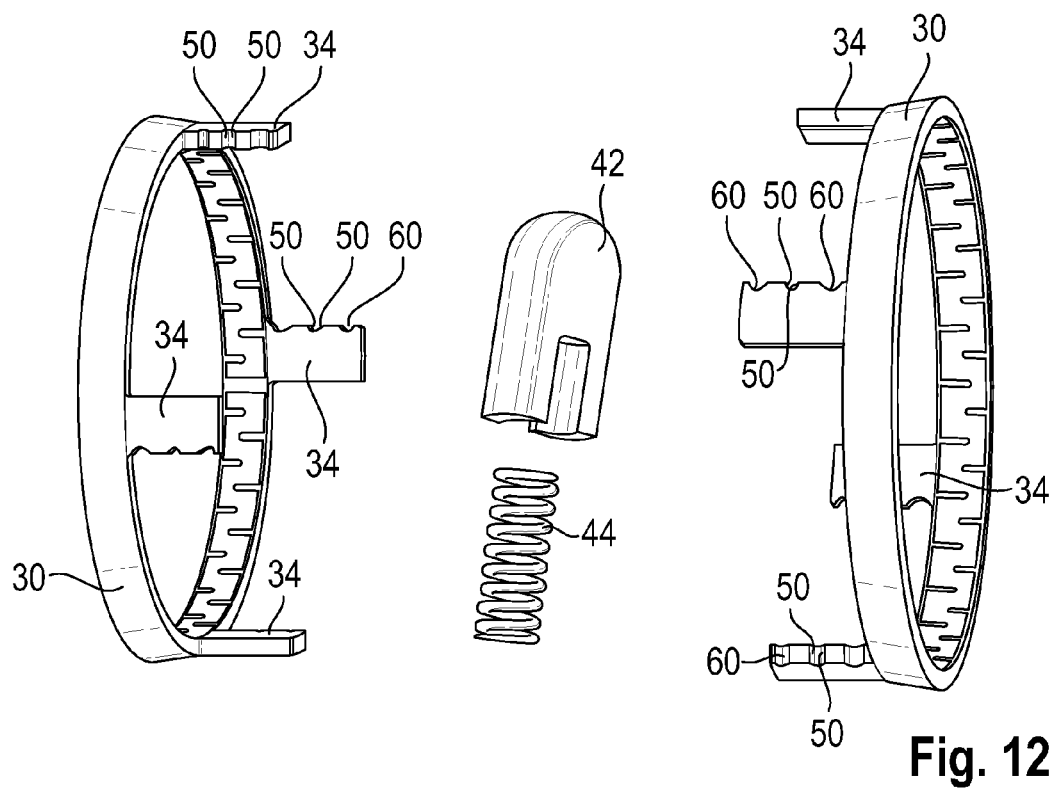
FIG. 12 shows the synchronizer rings and the thrust piece of the transmitter of FIG. 10 in an exploded view.
Figure 13:
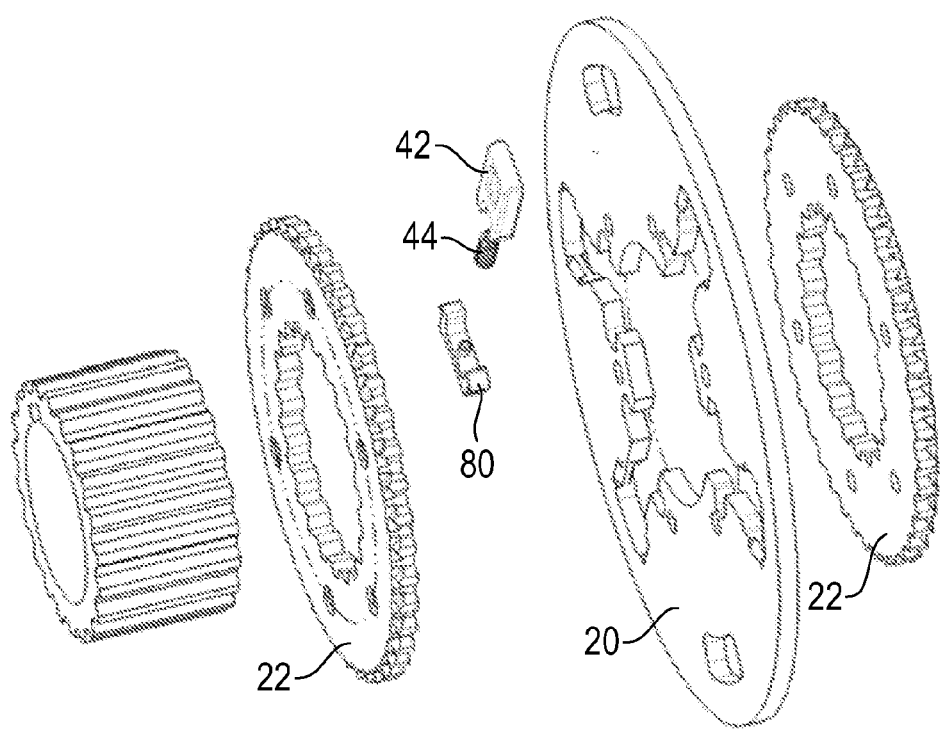
FIG. 13 shows a transmitter according to a third embodiment in an exploded view.
Figure 14:
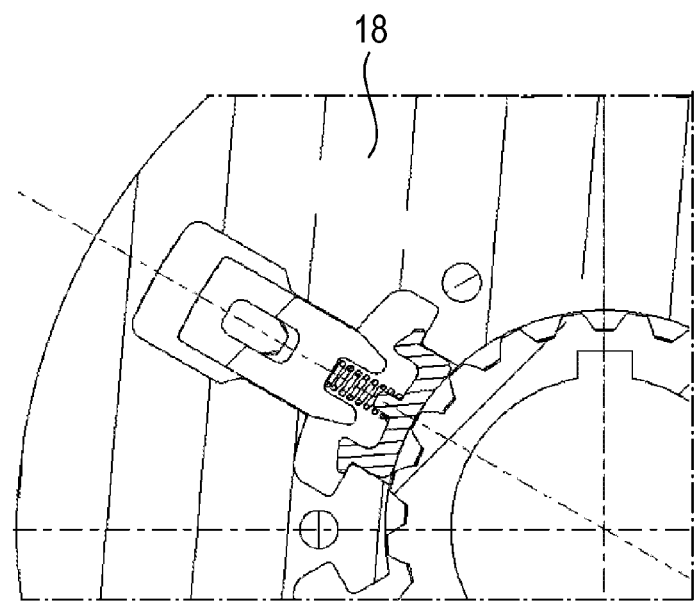
FIG. 14 shows the transmitter of FIG. 13 in a longitudinal section.
Figure 15:
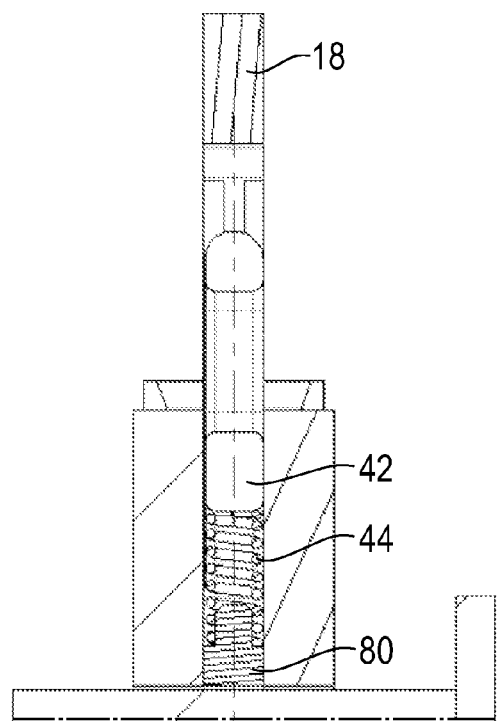
FIG. 15 shows the transmitter of FIG. 13 in a cross-section.
Figure 16:
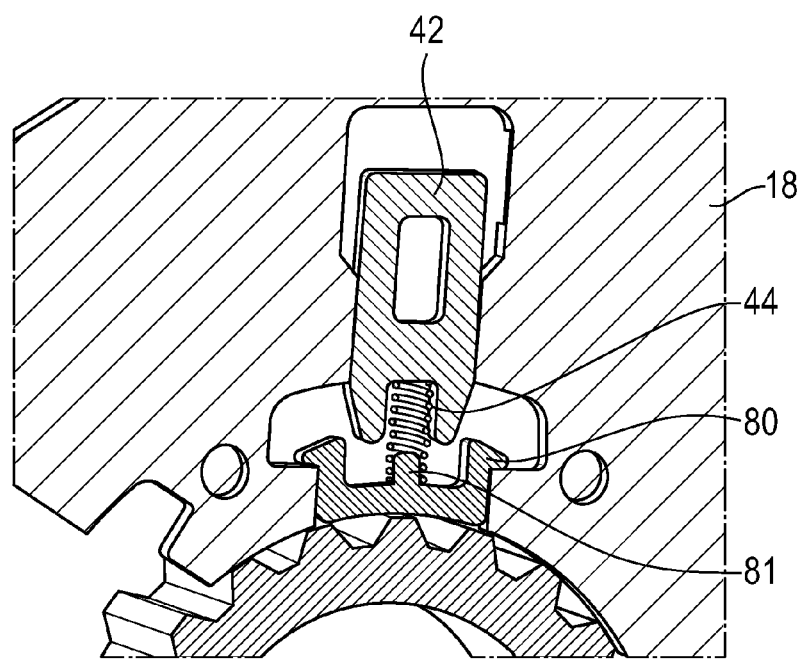
FIG. 16 shows the transmitter of FIG. 13 in a perspective view.

When the transmitter is moved from the neutral position shown in FIGS. 9 and 11 to the shifted-through position, that synchronizer ring 30 which does not hit a friction surface remains in its initial position relative to the synchronizer ring, in which the groove between the two locking surfaces 50 engages the edge of the recess 36. In the shifting-through process, merely the other synchronizer ring shifts relative to the transmitter while it is slightly rotated relative to the non-active synchronizer ring, with the thrust piece 42 sliding on the "inner edge", which has a straight configuration, of the drive dogs 34. When the respective gear is to be released again, the transmitter disk 20 entrains the corresponding synchronizer ring by means of the release slopes 60 until this synchronizer ring reaches its initial position again. The release slopes 60 additionally also serve to prevent a decoupling of the drive dogs from the transmitter in the shifted condition since the synchronizer rings are not connected axially.

FIGS. 13 to 16 show a third embodiment. Like reference numbers will be used for the components known from the preceding embodiments, and reference is made to the above explanations in this respect.

The third embodiment differs from the first two embodiments in regard to the configuration of the recess 36 for accommodation of the thrust pieces 42. In the third embodiment the recess 36 is designed to be open radially inward. In other words, the recess in the transmitter does not have a "bottom" against which the spring 44 could bear. Instead, provision is made for an abutment which is formed by a clip 80 here. The clip has two external edges which are formed as detent shoulders and by which the clip is supported at the transmitter 18, so that the recess 36 is closed radially inward. The spring 44 is supported at the clip 80, a spring mandrel 81 being provided on the clip 80 for fixing the spring in place. The assembly of the thrust pieces 42 and of the springs 44 in the transmitter is simplified by the recess 36 being configured to be open radially inward.

Figure 17:
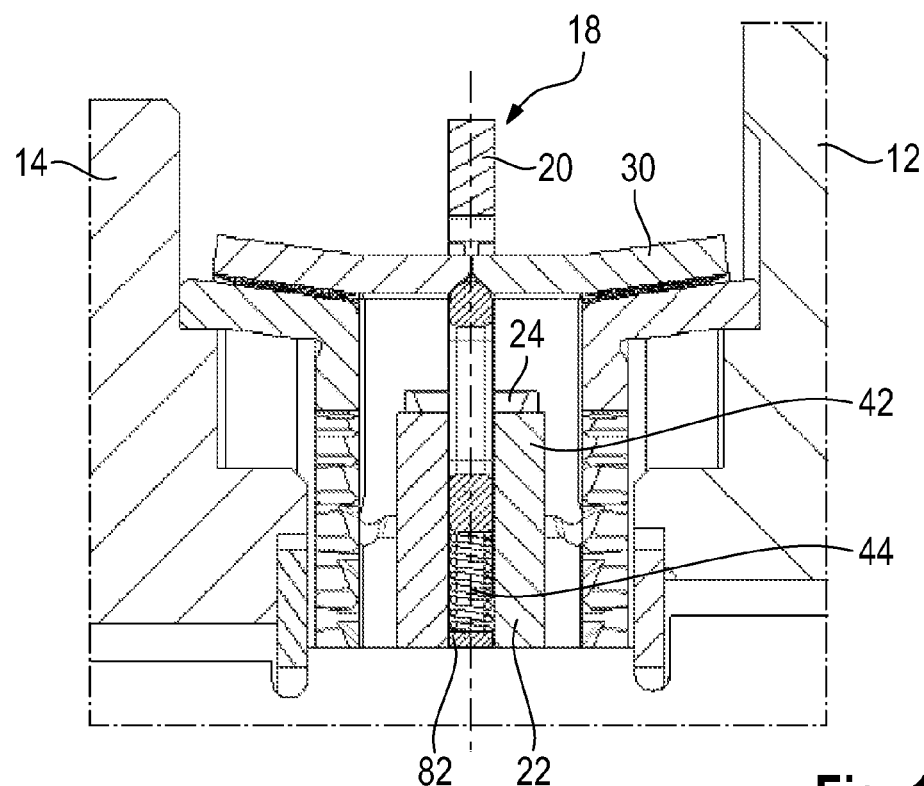
FIG. 17 shows a transmitter according to a fourth embodiment in a cross-section.
Figure 18:
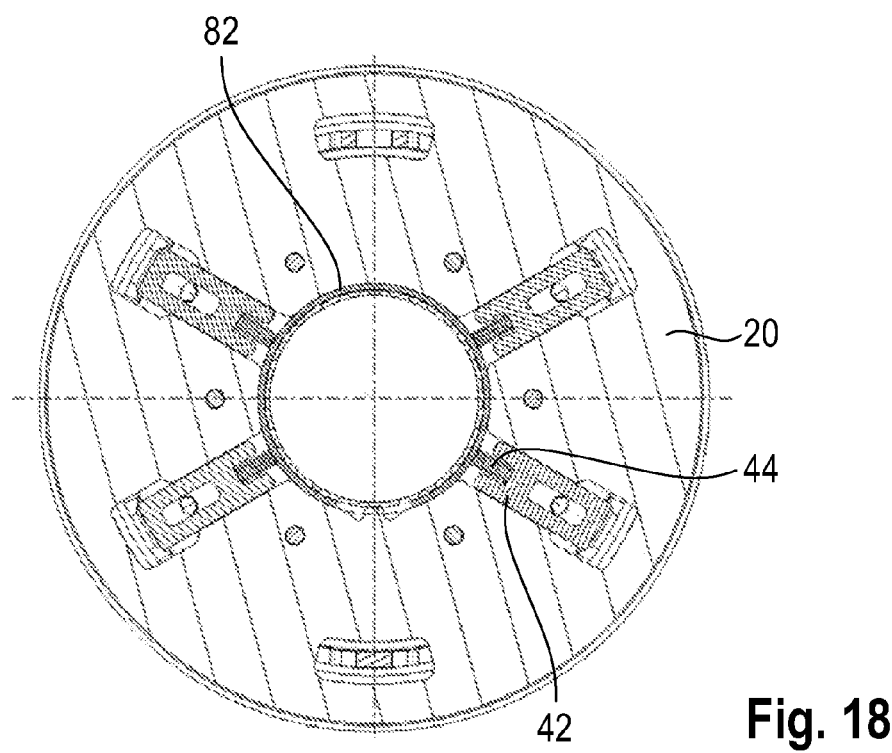
FIG. 18 shows the transmitter of FIG. 17 in a longitudinal section.
Figure 19:
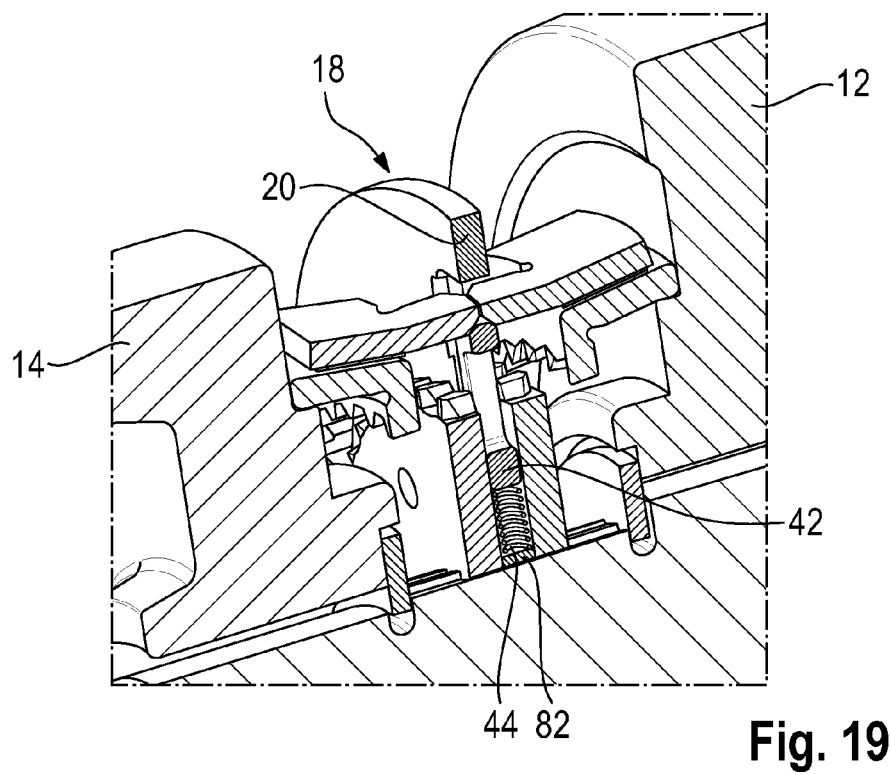
FIG. 19 shows the transmitter of FIG. 17 in a perspective sectional view.

A fourth embodiment is shown in FIGS. 17 to 19. Like reference numbers will be used for the components known from the preceding embodiments, and reference is made to the above explanations in this respect.

The fourth embodiment differs from the third embodiment in that the abutment for the spring 44 is formed by a holding ring 82 which extends along the outer edge of the inner opening of the transmitter in the peripheral direction and against which the springs 44 rest. This also allows the thrust pieces 42 to be assembled in the transmitter 18 in a simple manner. For assembly reasons, the holding ring 82 is preferably formed such that it rests elastically against the outer edge of the inner opening.

Figure 20:
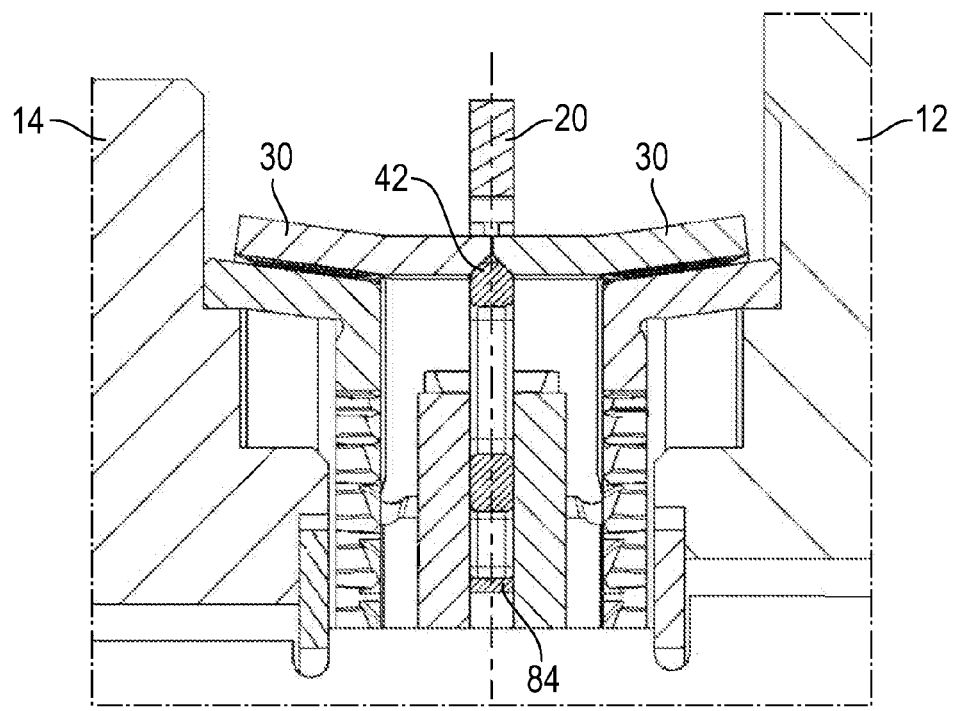
FIG. 20 shows a transmitter according to a fifth embodiment in a cross-section.
Figure 21:
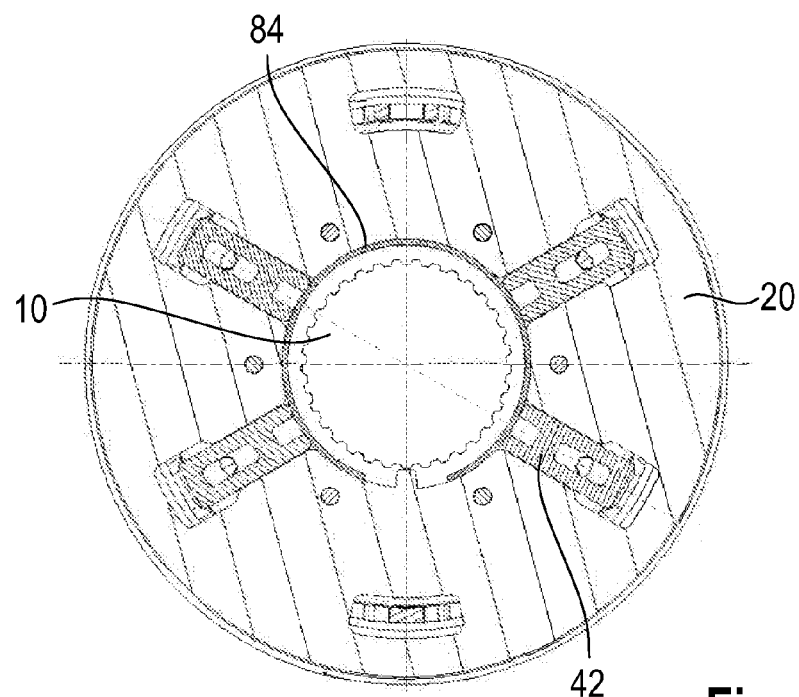
FIG. 21 shows the transmitter of FIG. 20 in a longitudinal section.
Figure 22:
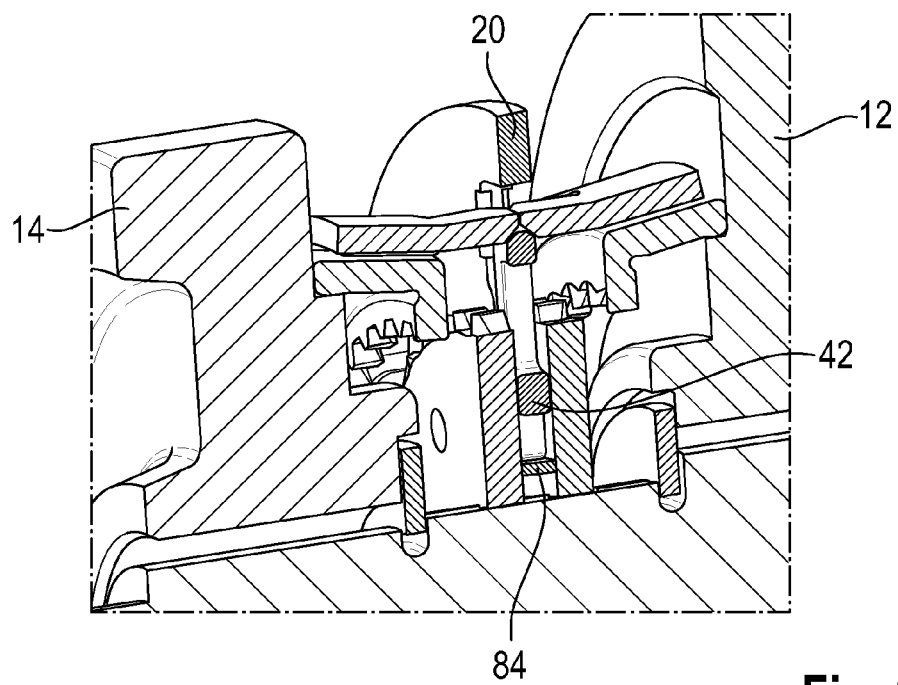
FIG. 22 shows the transmitter of FIG. 20 in a perspective sectional view.
Figure 23:
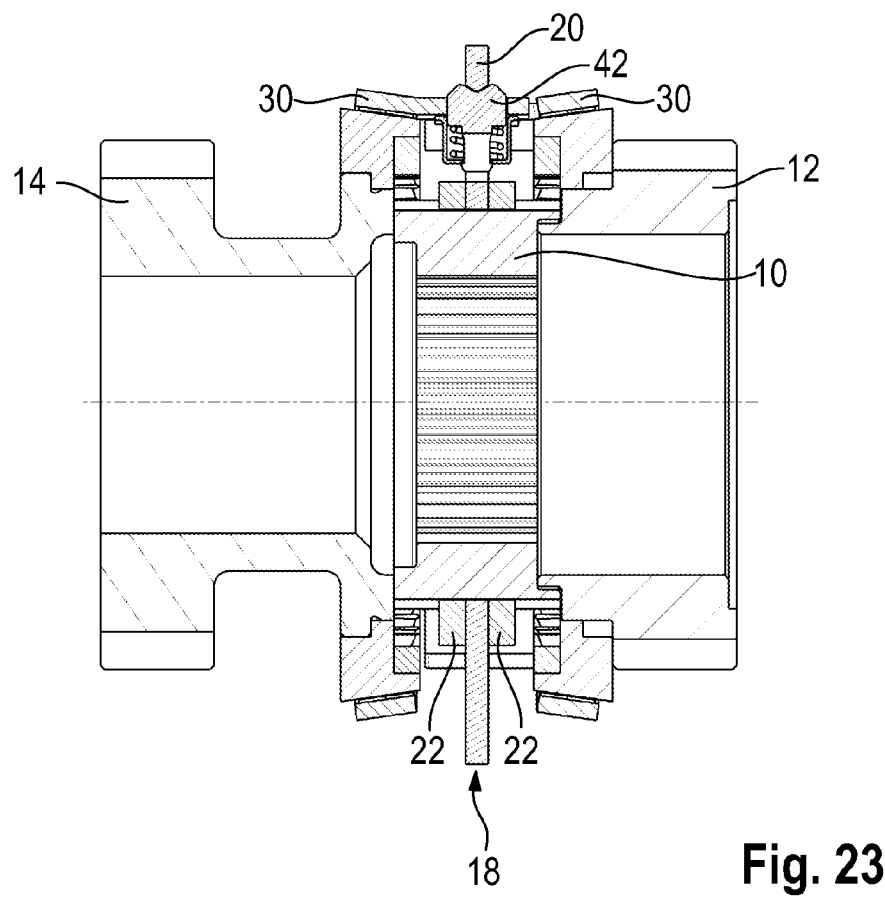
FIG. 23 shows a synchronizing assembly with a transmitter according to a sixth embodiment of the invention in a sectional view.
Figure 24:
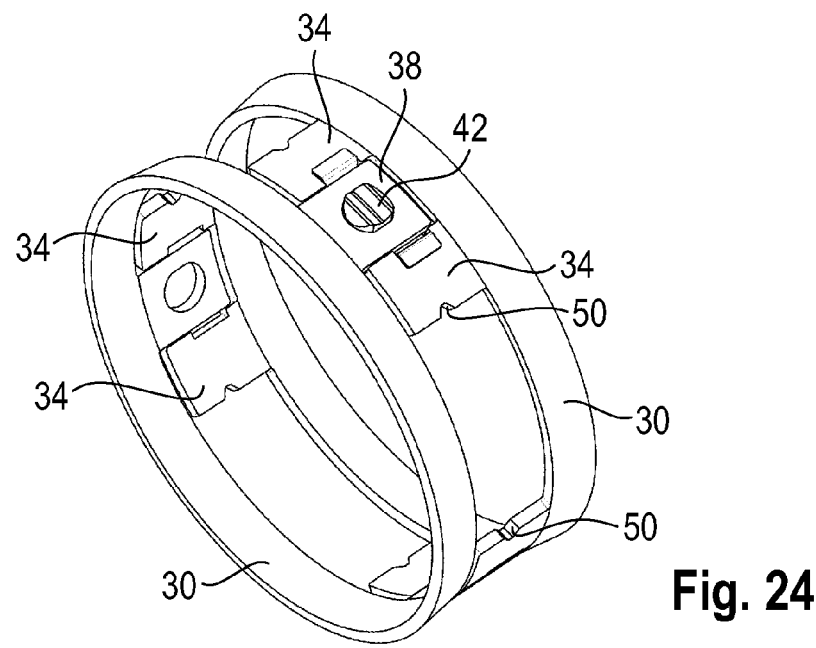
FIG. 24 shows a perspective view of the synchronizer rings, coupled to each other, for the transmitter of FIG. 23.
Figure 25:
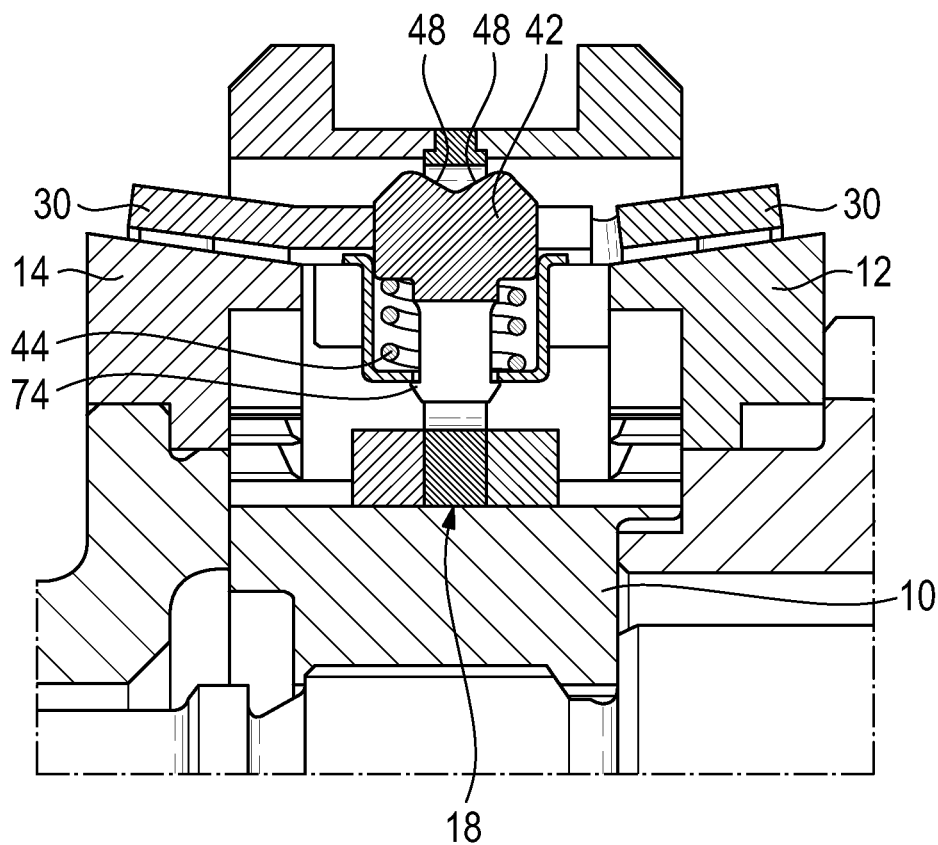
FIG. 25 shows the transmitter of FIG. 23 in an enlarged partial view.
Figure 26:
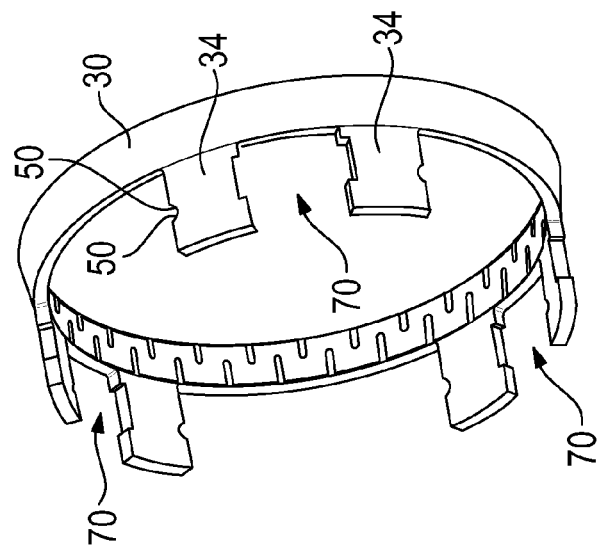
FIG. 26 shows the synchronizer rings and the thrust piece of the transmitter of FIG. 23 in an exploded view.
Figure 26:
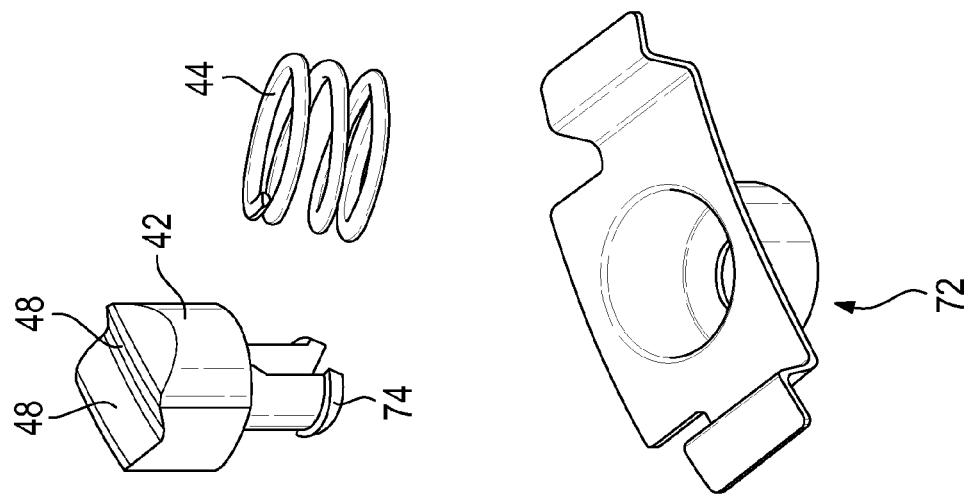
Figure 26:
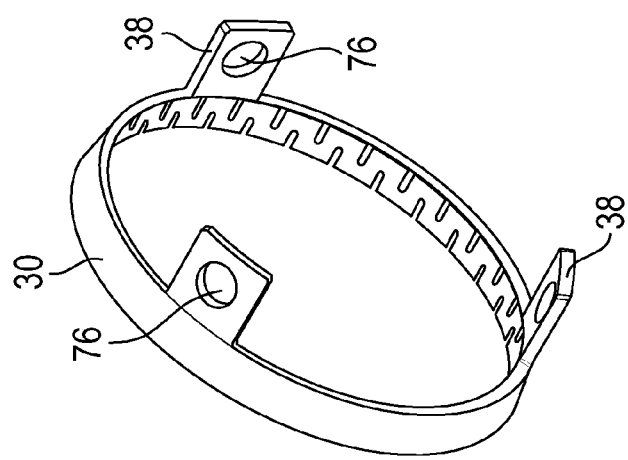

A fifth embodiment is shown in FIGS. 20 to 22. Like reference numbers will be used for the components known from the preceding embodiments, and reference is made to the above explanations in this respect.

The fifth embodiment differs from the fourth embodiment in that the springs 44 are replaced by a spring washer 84 which rests elastically against the outer edge of the inner opening of the transmitter. The thrust pieces 42 are directly supported at the spring washer 84. In contrast to the fourth embodiment, provision is made for a free space towards the gear shaft radially inside the spring washer 84, which allows a deflection of the spring washer 84. As a result, the springs used in the fourth embodiment may be dispensed with.

FIGS. 23 to 26 show a sixth embodiment. Like reference numbers will be used for the components already known from the preceding embodiments, and reference is made to the above explanations in this respect.

The third embodiment is similar to the preceding embodiments to the effect that the two synchronizer rings 30 are coupled to each other in the axial direction. The thrust piece is made use of for coupling here.

One of the two synchronizer rings 30 is provided with six drive dogs 34 which are associated with each other in pairs. Formed between the drive dogs 34 associated with each other is a seat 70 into which a holding cup 72 can be hung such that it is fixed in place in the axial direction. For this purpose, the seat 70 is formed to be undercut in the axial direction. The holding cup 72 is made of sheet metal and has a depression in which the spring 44 can be mounted together with the thrust piece 42. The thrust piece 42 is thereby guided in the holding cup 72.

The thrust piece 42 is provided with a snap-in hook 74 on its lower side, by means of which it can be captively fixed in place in a hole in the bottom of the holding cup 72.

The second synchronizer ring 30 is provided with three connecting tabs 38 which are each provided with an opening 76. To connect the two synchronizer rings with each other, at first three holding cups are hung into the three seats 70 of the synchronizer ring provided with the drive dogs 34. Then the second synchronizer ring is arranged at the first one such that its connecting tabs 38 each come to rest between two mutually associated drive dogs 34; the holding cup 72 is formed with angled holding edges, so that the drive dogs 34 and the connecting tabs 38 can be arranged on the same diameter. Finally, the thrust piece 42 and the spring 44 are inserted into the holding cup 72, so that the thrust piece 42 comes to lie within the opening 76. As a result, the two synchronizer rings 30 are coupled to each other both in the axial direction and in the peripheral direction.

Unlike in the first embodiment, in the third embodiment the pre-synchronizing slopes 48 are formed on the thrust piece 42 and therefore cooperate in the radial direction with the edge of the recess 36 in the transmitter disk 20. In the third embodiment, the locking surfaces 50 are arranged in the same manner as in the second embodiment, that is, located opposite each other in a V-shape on the outsides of the drive dogs 34.

When it is intended to change a gear, the transmitter is shifted in the axial direction. In the process, it entrains the two synchronizer rings 30 by means of one of the pre-synchronizing slopes 48, so that one of the synchronizer rings comes into engagement with the corresponding friction surface 32. A speed differential between the gear shaft and the speed change gear to be shifted makes sure that the assembly formed of the two synchronizer rings is acted upon in the peripheral direction, as a result of which the V-shaped incision between the two locking surfaces 50 facing each other is pressed against the edge of the recess 36. In this way, a shifting through of the transmitter is prevented as long as a friction moment acts on the respective synchronizer ring. It is not until the speed differential is eliminated that the transmitter succeeds in turning the synchronizer ring slightly back by means of the obliquely oriented locking surface 50, so that the transmitter can be shifted through.

To release the gear, the transmitter 18 is moved back to the neutral position; in the process, it returns the assembly formed of the two synchronizer rings 30 to the neutral position by means of the thrust piece 42.

The invention claimed is:

1. A transmitter for a synchronizing assembly of a manual transmission, the transmitter comprising:
   a transmitter disk;
   a thrust piece;
   a spring configured to cooperate with the thrust piece; and
   at least one synchronizer ring,
   wherein the thrust piece is configured to be acted upon by the spring such that the transmitter transmits a pre-synchronizing force to the synchronizer ring in an axial direction of the transmission,
   wherein the synchronizer ring comprises at least one drive dog disposed to extend in the axial direction into a recess in the transmitter disk, the drive dog comprises opposite locking surfaces which are arranged to engage with opposite internal edges of the recess in a peripheral direction of the transmission, and
   wherein the synchronizer ring comprises a pre-synchronizing slope disposed on a radially inner side of a free end of the drive dog and extended between the locking surfaces, the thrust piece being arranged to engage the pre-synchronizing slope when the spring urges the synchronizer ring in the axial direction.

2. The transmitter according to claim 1, wherein the thrust piece is guided in the transmitter in the peripheral direction and in the axial direction.

3. The transmitter according to claim 2, wherein the thrust piece is arranged in said recess which is opened inward in a radial direction of the transmission, and the spring is supported at an abutment that is configured separately from the transmitter.

4. The transmitter according to claim 3, wherein the abutment comprises a clip which is hung in the transmitter.

5. The transmitter according to claim 3, wherein the abutment comprises a holding ring which is inserted in the transmitter.

6. The transmitter according to claim 2, wherein the thrust piece is arranged in said recess which is opened inward in a radial direction of the transmission, and the spring is in the form of a spring washer which is inserted in the transmitter.

7. A transmitter for a synchronizing assembly of a manual transmission, the transmitter comprising:
   a thrust piece;
   a spring configured to cooperate with the thrust piece; and
   two synchronizer rings,
   wherein the thrust piece is configured to be acted upon by the spring such that the transmitter transmits a pre-synchronizing force to the synchronizer rings in an axial direction, and
   wherein each of the synchronizer rings has at least one connecting tab provided thereon by means of which the two synchronizer rings are connected with each other with an interlocking fit.

8. The transmitter according to claim 7,
   wherein each of the two synchronizer rings comprises a pre-synchronizing slope positioned obliquely in the axial direction,
   wherein the two synchronizer rings are connected with each other in the axial direction, and
   wherein, in an initial position, the thrust piece rests against the two pre-synchronizing slopes of the two synchronizer rings.

9. The transmitter according to claim 7, wherein the two synchronizer rings are mounted at the transmitter for rotation in a peripheral direction,
   wherein the two synchronizer rings include two drive dogs which are arranged opposite each other and which each have two locking surfaces provided thereon, and
   wherein the thrust piece pushes the two drive dogs apart in the peripheral direction, so that the two drive dogs rest against the transmitter in opposite directions.

10. The transmitter according to claim 9, wherein each synchronizer ring comprises four drive dogs.

11. The transmitter according to claim 10, wherein each drive dog comprises two release slopes provided thereon which are spaced apart from the locking surfaces in the axial direction.

12. The transmitter according to claim 7, wherein the two synchronizer rings comprise first and second synchronizer rings mounted at the transmitter and the thrust piece is mounted in the first synchronizer ring and engages into an opening in the second synchronizer ring.

13. The transmitter according to claim 12, wherein the thrust piece is mounted in a holding cup which is configured to serve as an abutment for the spring.

14. The transmitter according to claim 13, wherein the thrust piece is captively fixed in place at the holding cup by a snap-in hook.

15. The transmitter according to claim 13, wherein the first synchronizer ring comprises two drive dogs which are located opposite each other, and between which the holding cup is configured to be hung in.

16. The transmitter according to claim 15, wherein two locking surfaces are disposed on peripherally exterior edges of the drive dogs.

17. The transmitter according to claim 15, wherein the two synchronizer rings comprise three groups of drive dogs located opposite each other.

18. The transmitter according to claim 12, wherein the opening is formed in the at least one connecting tab of the second synchronizer ring.

19. The transmitter according to claim 12, wherein the thrust piece comprises two pre-synchronizing slopes which are configured to engage the transmitter.

20. A transmitter for a synchronizing assembly of a manual transmission, the transmitter comprising:
- a transmitter disk comprising a recess;
- a thrust piece;
- a spring configured to cooperate with the thrust piece; and
- at least one synchronizer ring,
- wherein the thrust piece is configured to be acted upon by the spring such that the transmitter transmits a pre-synchronizing force to the synchronizer ring in an axial direction,
- wherein the thrust piece is guided in the transmitter in a peripheral direction and in the axial direction,
- wherein the thrust piece is arranged in the recess which is opened inward in a radial direction, and the spring is in the form of a spring washer which is inserted in the transmitter.

* * * * *